United States Patent [19]
Johnson et al.

[11] Patent Number: 5,498,757
[45] Date of Patent: Mar. 12, 1996

[54] MILK FROTHING AND HEATING SYSTEM

[75] Inventors: Michael W. Johnson, St. Helens; Christopher J. Engler, Portland, both of Oreg.

[73] Assignee: Boyd Coffee Company, Portland, Oreg.

[21] Appl. No.: 417,072

[22] Filed: Apr. 4, 1995

[51] Int. Cl.$^6$ .............................. A23C 3/00; A47J 31/00
[52] U.S. Cl. .................... 426/520; 99/323.1; 99/453; 261/28; 261/152; 261/DIG. 16; 426/522
[58] Field of Search .................... 426/520, 522, 426/433; 99/323.1, 453; 261/28, 152, DIG. 16

[56] References Cited

U.S. PATENT DOCUMENTS

| | | | |
|---|---|---|---|
| 3,758,080 | 9/1973 | MacManus | 261/75 |
| 4,137,833 | 2/1979 | Yelloz | 99/293 |
| 4,557,187 | 12/1985 | DePonti | 99/293 |
| 4,565,121 | 1/1986 | Ohya et al. | 99/293 |
| 4,800,805 | 1/1989 | Mahlich et al. | 99/323.1 |
| 4,827,904 | 5/1989 | Bonanno | 99/293 |
| 4,852,474 | 8/1989 | Mahlich et al. | 99/293 |
| 4,922,810 | 5/1990 | Siccardi | 99/293 |
| 4,945,824 | 8/1990 | Borgmann | 99/293 |
| 4,960,042 | 10/1990 | Grossi | 99/293 |
| 5,154,110 | 10/1992 | Chang | 99/293 |
| 5,207,148 | 5/1993 | Anderson et al. | 99/281 |
| 5,265,519 | 11/1993 | Schiettecatte et al. | 99/293 |
| 5,265,520 | 11/1993 | Giuliano | 99/323.1 |
| 5,330,266 | 7/1994 | Stubaus | 99/293 |
| 5,335,588 | 8/1994 | Mahlich | 99/293 |
| 5,339,725 | 8/1994 | De'Longhi | 99/293 |
| 5,372,061 | 12/1994 | Albert et al. | 99/293 |

Primary Examiner—George Yeung
Attorney, Agent, or Firm—Kolisch Hartwell Dickinson McCormack & Heuser

[57] ABSTRACT

A milk frothing system is provided whereby milk is first frothed by controlled introduction of air, and then heated by circulation in a conduit which passes through a hot water tank. Milk initially is drawn into a milk frother from a cold milk supply, such milk supply preferably being replaceably housed in an onboard refrigerator. Once frothed, milk is directed through a frothed milk conduit, passing through an ambient pressure hot water tank so as to heat the frothed milk. An espresso water conduit similarly may be connected to a water supply, such espresso water conduit passing water through the hot water tank so as to heat the water. The heated water is passed through espresso grounds to produce espresso which is discharged through an espresso discharge nozzle. The hot frothed milk is passed directly through a milk discharge nozzle for use in making a beverage such as cappuccino or the like.

20 Claims, 3 Drawing Sheets

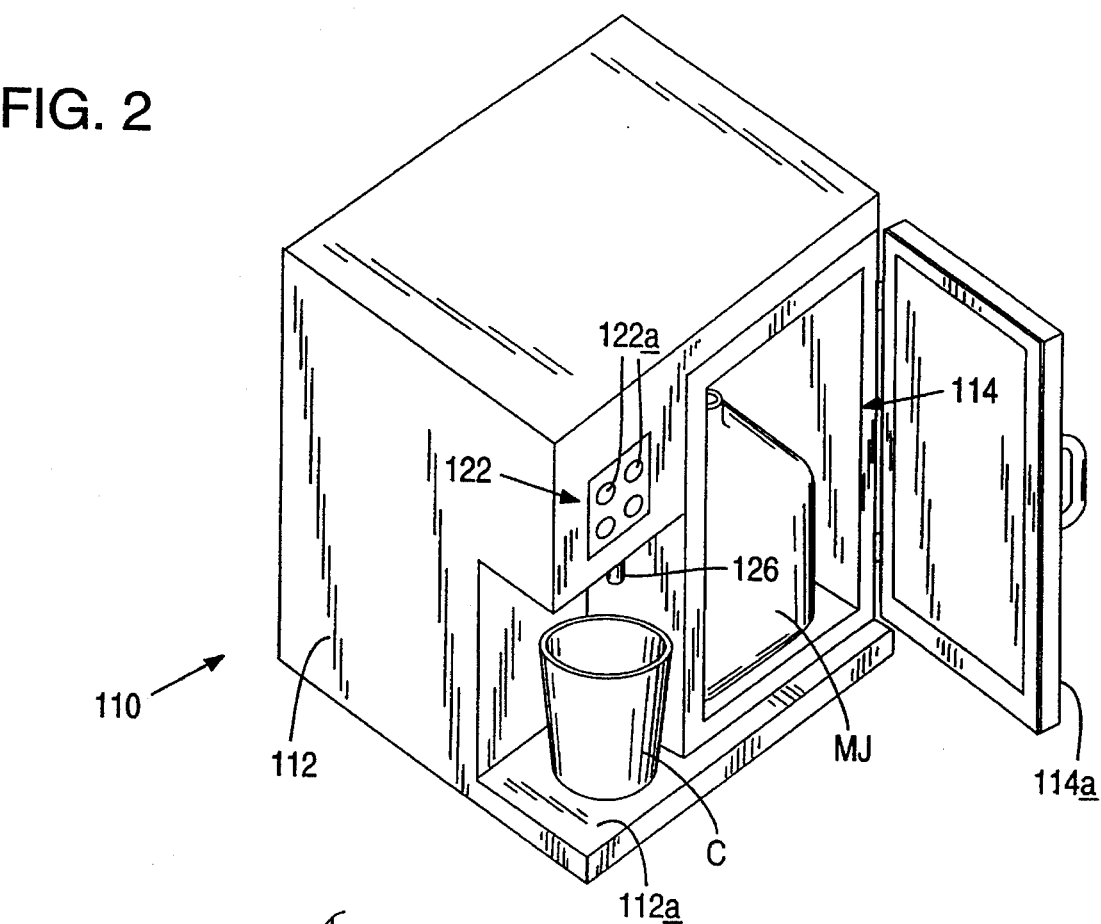
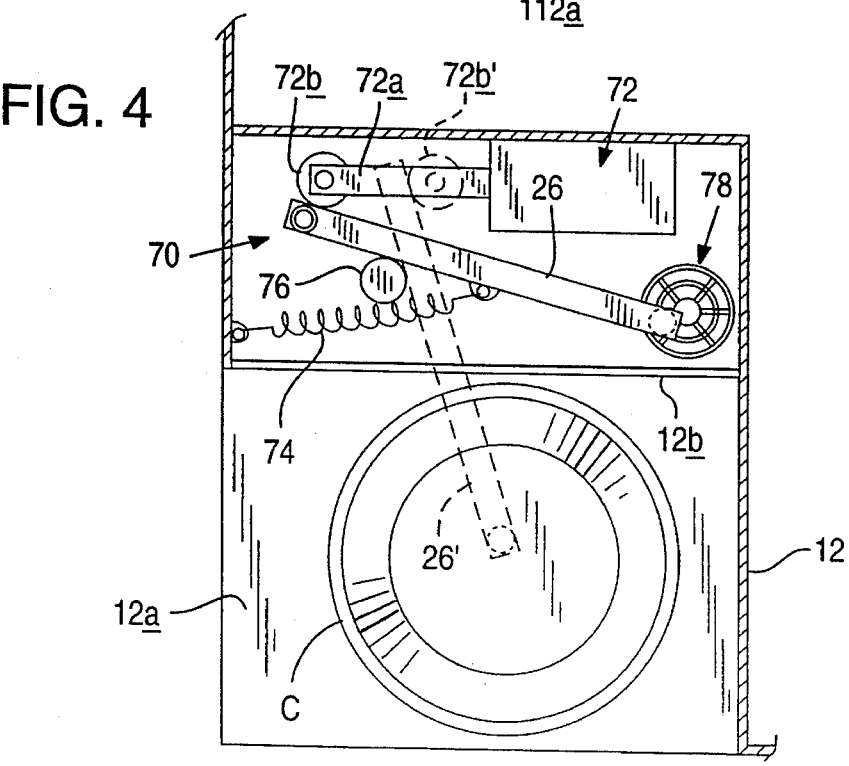

MILK FROTHING AND HEATING SYSTEM

FIELD OF THE INVENTION

The present invention relates generally to beverage preparation, and more particularly to a system for use in frothing and heating milk. Although the invention has broad utility, it has proven particularly well suited for use in the preparation of espresso beverages, and is described in that context below.

BACKGROUND ART

From the beginning, espresso beverages have been prepared by passing a measured amount of hot water through a filter which carries a quantity of ground espresso beans. Upon passing through the filter, the water picks up bean particles, transforming the water into "espresso" for consumption, either alone, or as an ingredient of a further-prepared beverage or drink. The final product may, for example, take the form of a "cappuccino", a beverage which includes both espresso and a quantity of hot frothed milk. Such beverages may of coarse be prepared manually, but more often arc prepared using a somewhat automated espresso machine.

In a conventional espresso machine, espresso is prepared using a pressurized boiler which provides hot water for injection through the ground espresso beans and into a prepositioned cup. The boiler also provides high-pressure steam for passage through a steam discharge nozzle, the nozzle being configured to extend into a container of milk to simultaneously heat and froth the milk. In order to promote the admission of air into the milk, the container is slowly moved up and down relative to the nozzle, thus enhancing the frothing process. The hot frothed milk then is added to the espresso, is garnished, and is served to the consumer as a "cappuccino".

Although relatively simple, the above-described arrangement is inadequate in several respects. For example, those skilled will appreciate that pressurized boilers are expensive to manufacture, generally requiring construction of a material such as copper or brass. Further, the use of a boiler may be dangerous to the operator, particularly in the event of boiler failure, an event which may result in uncontrolled discharge of hot water or steam. Such a failure similarly could damage surrounding property, and could injure others in the vicinity of the machine. It thus would be desirable to provide an espresso machine which does not require the use of a pressurized boiler.

The aforementioned milk frothing system also is less than optimal, the system's operation requiring more than a minimum degree of expertise. Namely conventional milk frothing requires proper positioning of the nozzle within the milk container, and requires a proper frequency and amplitude of up and down container movements. In addition, the use of steam to heat and froth milk can result in operator injury due to splattering of hot milk. For example, if the container holds a relatively small "quantity" of milk and the nozzle is positioned at a level where steam can escape above the upper level of milk, droplets of milk could be sprayed from the container to the area surrounding the espresso machine.

What is needed is an espresso machine which is capable of simply and safely providing hot frothed milk. More particularly, it would be desirable to provide a milk heating and frothing system which does not require the use of a boiler, and which does not require the use of steam.

SUMMARY OF THE INVENTION

To solve these problems, a milk frothing system is provided whereby milk is first frothed by controlled introduction of air, and then heated by circulation in a conduit which passes through a hot water tank. Milk initially is drawn into a milk frother from a cold milk supply, such milk supply preferably being replaceably housed in an onboard refrigeration unit. Once frothed, milk is directed through a frothed milk conduit, passing through an ambient pressure hot water tank so as to heat the frothed milk. An espresso water conduit similarly may be connected to a tap water supply, such espresso water conduit passing water through the hot water tank so as to heat the water. The heated water is passed through espresso grounds to produce espresso which is discharged through an espresso discharge nozzle. The hot frothed milk is passed directly through a milk discharge nozzle for use in making a beverage such as cappuccino or the like.

In accordance with one embodiment of the invention, the system is further provided with an on-board sanitization subsystem which selectively flushes the milk flow path with a sterilizing fluid such as hot water from the hot water tank. The system's milk discharge nozzle correspondingly may be pivoted between a frothed milk discharge orientation wherein the milk discharge nozzle is configured to discharge hot frothed milk into a beverage container, and a sanitization orientation wherein the milk discharge nozzle is configured to discharge sterilizing fluid into an isolated waste reservoir.

These and other objects and advantages of the present invention will be more readily understood after a consideration of the drawings and the detailed description which follows.

BRIEF DESCRIPTION OF THE DRAWINGS

FIG. 2 is an isometric view of an alternative embodiment milk heating and frothing system, such system taking the form of a dedicated milk heating and frothing machine.

FIG. 4 is a fragmentary top plan view of a portion of the coffee/espresso machine depicted in FIG. 1, such view illustrating mechanism whereby the frothed milk discharge nozzle may be pivoted for discharge of sanitization fluid into an isolated waste fluid reservoir.

DETAILED DESCRIPTION OF THE PREFERRED EMBODIMENT

Figure 1:
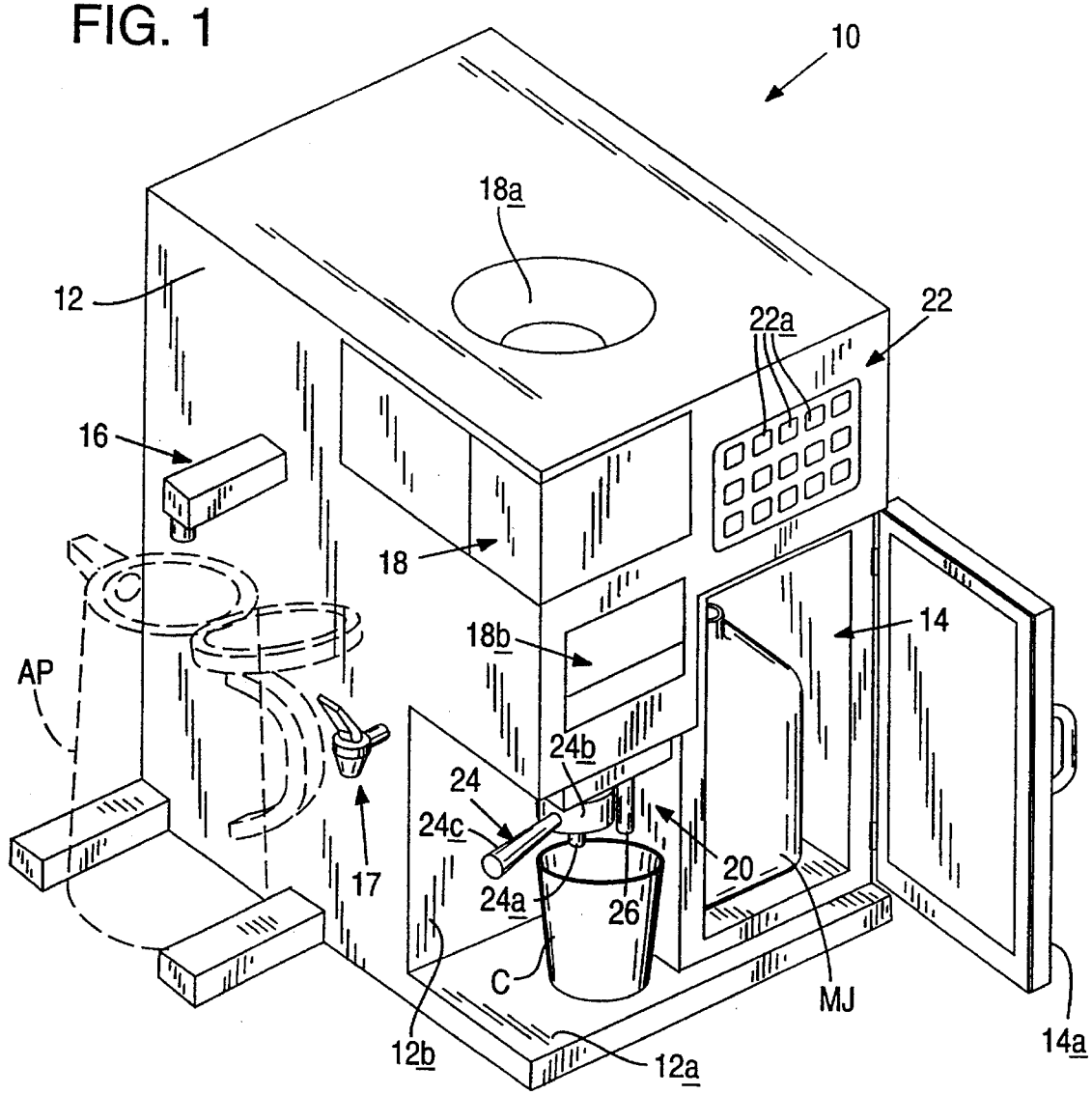
FIG. 1 is an isometric view of a coffee/espresso machine which employs a milk heating and frothing system constructed in accordance with a preferred embodiment of the invention.

FIG. 1 shows, at 10, a specially-constructed coffee/espresso machine which includes a milk heating and frothing system constructed in accordance with a preferred embodiment of the invention. The depicted machine is shown in somewhat simplified form, such machine including a generally rectangular chassis 12 with a planar cup support surface, or drainboard 12a. The drainboard supports a cup C which is positioned for receipt of both espresso and milk from an onboard refrigeration system 14.

Machine 10, it will be noted, is of the stand-alone variety, the machine's chassis being configured to house all that is necessary to make a variety of conventional coffee and espresso drinks. The machine thus includes a coffee-maker 16, a bean grinder 18, an espresso-maker 20, and a heating and frothing system capable of providing hot frothed milk. Such systems are directed using an onboard controller, preferably in the form of a microprocessor (not shown) operated by keypad 22. Electrical energy is provided to the machine via an electrical connection arrangement including a conventional power cord which, for the sake of clarity and simplicity, is not shown. All other parts which are not shown, but which are necessary for proper operation of machine 10, are understood to be of conventional design.

The refrigeration system is provided to house an onboard cold milk supply, such milk supply being configured to furnish milk to the invented heating and frothing system for use in preparing a beverage such as a cappuccino or a latte. In the depicted machine, refrigeration system 14 takes the form of a small refrigerator, such system including an interior chamber which is cooled via conventional refrigeration mechanism (not shown). The interior chamber is sized to accommodate receipt of a readily-replaceable milk container, preferably in the form of a common 1-gallon milk jug MJ. Milk jug MJ thus will be understood to serve as the machine's cold milk supply, cold milk being passed from the milk jug to the heating and frothing system for processing as will be described below. An insulated door 14a is attached to the machine's chassis by hinges to selectively close access to the interior chamber so as to keep the milk supply cold.

Coffee-maker 16 takes the form of a conventional coffee brewer, including a hot water spigot which discharges hot water into an airpot such as that shown at AP. Airpot AP, it will be appreciated, may be of conventional design, including a removable filter (not shown) configured to hold ground coffee beans. Hot water is passed through the filter, and into the airpot as coffee. In the depicted embodiment, the machine also is provided with a second spigot 17, which may be used as a source of hot water for use in making beverages such as tea, hot cocoa, or the like.

Espresso-maker 20 also employs a filter, such filter being adapted for receipt of ground espresso beans. The espresso-maker's filter preferably takes the form of a conventional bayonet portafilter such as that shown at 24. As indicated, the filter is mounted to the machine's chassis, and includes an espresso discharge nozzle 24a, usually in a position which overlies the machine's drainboard. In order to make espresso, hot water is passed through a filter carrier 24b in controlled sequences, the resulting espresso being emitted through nozzle 24a. An insulated handle 24c provides the operator with the ability quickly to disconnect the portafilter, pack the filter carrier with ground espresso beans, and reconnect the portafilter to the machine's chassis. Those skilled will appreciate, however, that the conventional portafilter arrangement may be replaced by a "pod" arrangement (not shown) wherein prepackaged pods of espresso grounds are used. Various other espresso-making arrangements similarly may be employed without departing from the invention which is defined herein.

Bean grinder 18 allows the operator to grind coffee beans or espresso beans without the need for a separate appliance, such beans being specially ground for use in either the coffee-maker or the espresso-maker. Beans are deposited in hopper 18a, are passed through conventional grinding mechanism (not shown), and are deposited in a bin such as that shown at 18b or directly into the portafilter for use in making espresso. Ground beans thus readily may be obtained by the machine's operator.

As previously indicated, the coffee/espresso machine may be somewhat automated, possibly through the use of an onboard controller such as a microprocessor or the like. Keypad 22, which includes a variety of control keys 22a, may be used to direct operation of the microprocessor, and thus to direct operation of the machine. Keyed commands may, for example, include: SINGLE ESPRESSO; DOUBLE ESPRESSO; HALF AIRPOT; LATTE; TALL LATTE; FULL AIRPOT; CAPPUCCINO; TALL CAPPUCCINO; TEA; RINSE; HOT MILK; HOT WATER; ON/OFF; FROTH and GRIND. The SINGLE ESPRESSO and DOUBLE ESPRESSO keys could direct discharge of either a "single" or "double" espresso shot through espresso discharge nozzle 24a. The HALF AIRPOT and FULL AIRPOT keys similarly could direct discharge of different quantities of hot water through the coffee spigot. The LATTE and TALL LATTE keys could direct automated discharge of espresso through espresso discharge nozzle 24a and ;hot milk through milk discharge nozzle 26 so as to produce different size latte drinks. Similarly, the CAPPUCCINO and TALL CAPPUCCINO keys could direct automated discharge of espresso through espresso discharge nozzle 24a and hot frothed milk through milk discharge nozzle 26 so as to produce different size cappuccino drinks. Other keys could direct discharge of hot milk, hot frothed milk, or water for tea, as should be apparent from the above-identified key commands. Various other operations similarly could be directed by a microprocessor or onboard keypad.

In FIG. 2, an alternative beverage machine is depicted at 110, such machine simply including a system for frothing and heating milk. The machine is designed as an appliance for use in connection with conventional coffee/espresso machines, the depicted machine having its own chassis 112. The machine is useful in adding heated and/or frothed milk to a cup C which already contains espresso and which has been placed on drainboard 112a. Machine 110 includes an onboard refrigeration system 114, such system defining a refrigerated chamber of a size which will accommodate a conventional 1-gallon milk jug MJ. A door 114a is openable and closable, allowing for ready replacement of the milk jug. An onboard controller (not shown) is directed by keypad 122 to discharge milk variously through milk discharge nozzle 126. Keys 122a, for example may direct discharge of either hot milk, hot frothed milk, or hot water so as to rinse the system after completing use.

Figure 3:
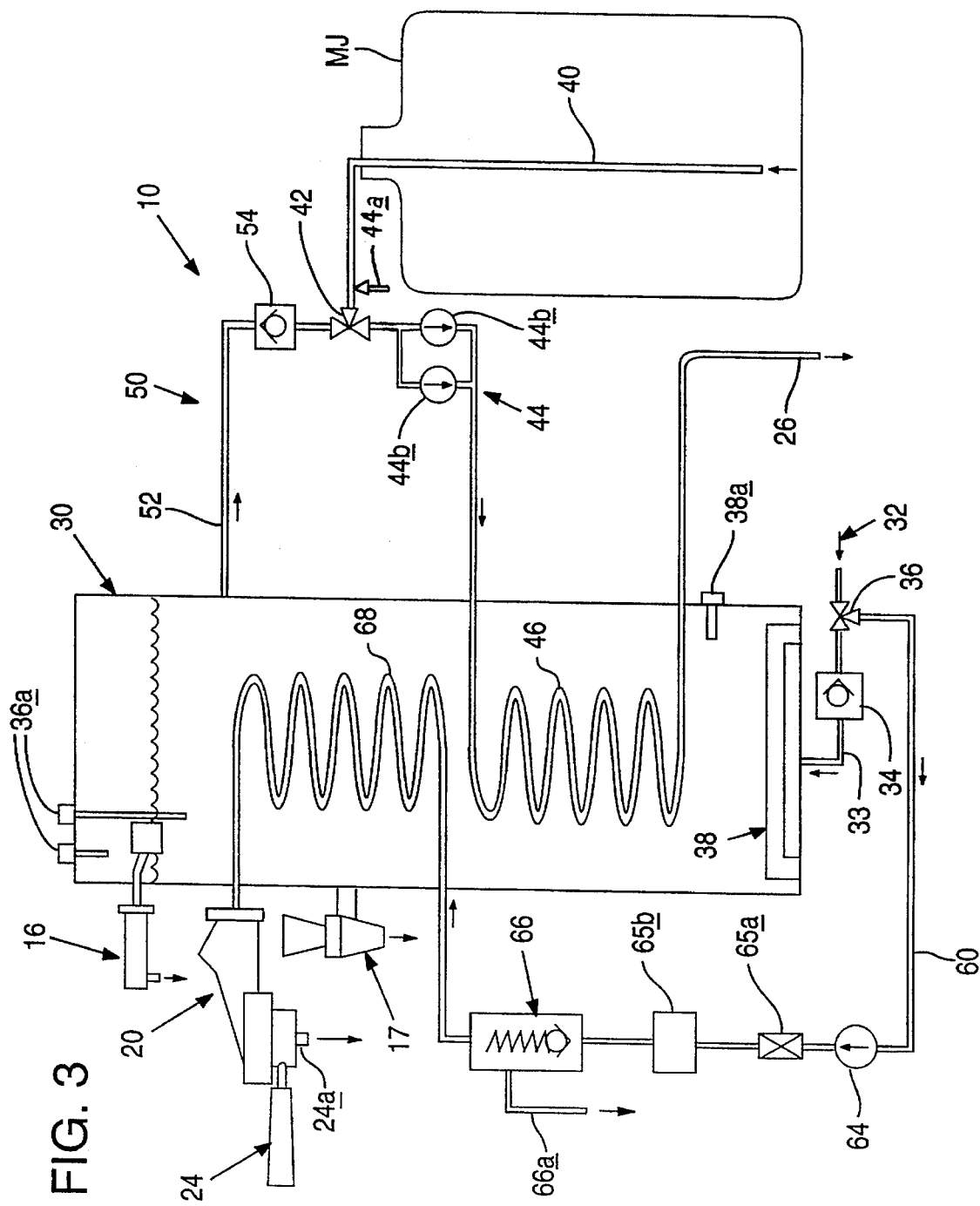
FIG. 3 is a somewhat schematic diagram which illustrates fluid flow within the coffee/espresso machine depicted in FIG. 1.

FIG. 3 is a somewhat schematic representation of coffee/espresso machine 10, such schematic illustrating the flow of fluid within the depicted machine. As indicated, the machine includes an onboard hot water tank 30, such tank selectively being fed by a tap water supply 32 via a water supply conduit 33. Conduit 33, it will be noted, passes water to the water tank through a one-way valve 34 and a flow selector valve 36. Flow selector valve 36 is operated by the machine's controller, generally directing inflow of water into hot water tank 30 only upon detecting a low water condition within the hot water tank. The controller thus employs one or more water level sensors, or probes, 36a, such sensors being capable of detecting when the water level within the hot water tank drops below a predetermined level. When the water level fails below such predetermined level, water selector valve 36 is directed to allow flow of water into tank 30 through water conduit 33.

In the present embodiment, water flows into the bottom of the hot water tank, preferably near a heating element 38 so as to minimize the effect of the cooler tap water on the temperature of the water contained within the hot water tank. The machine's controller employs a temperature sensor 38a which determines the temperature of the water within tank 30 for use in directing operation of heating element 38.

When the water temperature within the hot water tank falls below a predetermined temperature, the controller will direct heating element 38 to activate, thus heating the water within tank 30 until a desired temperature is reached.

Focussing now on the preparation of hot frothed milk, attention is directed to milk jug MJ which, it will be recalled, acts as the heating and frothing system's cold milk supply. As indicated, the milk jug is of conventional construction, including an upper opening which will be seen to receive a milk conduit 40 which is capable of selectively drawing milk from milk jug MJ and passing it downstream along a milk flow path. The conduit extends from the refrigeration system (not shown in FIG. 3) to a milk selector valve 42 which forms a part of a milk frother 44 for frothing of the still cold milk.

Milk frother 44 includes a controlled air inlet valve 44a and one or more fluid pumps 44b. The air inlet valve draws air from the atmosphere, and the pumps draw milk from refrigerated milk jug MJ. Referring to FIG. 3, it will be noted that air inlet valve 44a preferably is positioned between selector valve 42 and the milk jug. The air inlet valve thus also acts as a relief valve to ensure that milk will drain back into the refrigerated milk jug when the frother is not in use. Air inflow is controlled by adjustment of the air inlet valve, either manually, or automatically under microprocessor control. Where unfrothed milk is desired, the air inlet valve may be directed to halt the inflow of air. The pumps similarly may be adjusted, or may selectively cooperate to vary fluid flow. The pumps serve both to mix, or agitate, the milk and air, and to direct milk flow downstream.

From the milk frother, milk is passed downstream through a frothed milk conduit 46, such conduit being positioned to extend into the hot hater tank, and then out to the milk discharge nozzle 26. Upon passage through the hot water tank, the frothed milk is heated to a temperature which optimizes beverage flavor and minimizes danger to the machine operator. This temperature is controlled by the diameter and length of the frothed milk conduit while within the hot water tank. To increase frothed milk temperature, for example, conduit 46 may be coiled within tank 30, thereby increasing the distance the frothed milk must travel while in the hot water tank. This, in turn, increases the time the frothed milk spends in the hot water tank. In contrast, the diameter of the frothed milk conduit may be made relatively large so as to reduce the effects of passage through the hot water tank. The conduit also may be coiled in a lower region of the hot water tank so as to bring the conduit closer to heating element 38.

The depicted coffee/espresso machine also will be seen to include a sanitization subsystem 50 whereby the milk's flow path may be rinsed by passing water through milk frother 44 and through frothed milk conduit 46. Such water is drawn from the hot water tank via a sanitization conduit 52 which connects to the milk frother through a milk selector valve 42. A one-way valve 54 ensures that milk will not flow into the hot water tank. Milk selector valve 42 operates under direction of the machine's controller to select between milk from milk conduit 40, and hot water from sanitization conduit 52. A sanitization cycle may, for example, be selected using a RINSE key of the machine's keypad.

The machine's espresso-maker 20 also may pass tap water through hot water tank 30 in order to heat the tap water for use in making espresso. This avoids the need for a pressurized boiler. Too make espresso, water is taken in from tap water supply 32, such water being directed via selector valve 36 into espresso water conduit 60. Water then flows along an espresso water flow path, such water being controllably drawn through conduit 60 using a pump 64. Pump 64 is operated by the machine's controller so as to ensure proper water flow. The water is directed through various flow control mechanism including orifice 65a, flow meter 65b, and relief valve 66 (which includes a discharge port 66a). The water then travels through coiled espresso water conduit 68 which extends through an upper region of the hot water tank 30 above milk froth conduit 46. The coiled espresso water conduit is of a length which provides for heating of the espresso water to an appropriate temperature for use in making espresso. Once heated, the espresso water will pass into portafilter 24 and out of the machine through espresso discharge nozzle 24a.

FIG. 4 shows a sanitization discharge selector arrangement whereby discharge nozzle 26 is pivoted between a frothed milk discharge orientation (shown in dashed lines) and a sanitization orientation (shown in solid lines). As indicated, such movement is effected by a solenoid 72, the solenoid including a retractable shaft 72a and a roller 72b. When the solenoid is activated, shaft 72a is fully extended, engaging discharge nozzle 26 so as to urge such nozzle toward the sanitization orientation.

Upon solenoid deactivation, the solenoid's shaft will retract, correspondingly retracting the shaft's roller as indicated at 72b'. This, in turn will allow spring 74 to pull the discharge nozzle to the frothed milk discharge orientation as indicated at 26'. Nozzle 26, it will be noted, is biased toward the frothed milk discharge orientation by spring 74, such nozzle being pivotal about pivot pin 76. It will, of course, be understood that the discharge nozzle 26 may alternatively be biased toward the sanitization orientation, and pivoted to discharge hot frothed milk.

When the pipe is in the sanitization discharge orientation, discharge water is expelled behind a protective wall 12b, the discharged water passing into a waste reservoir and through a drain 78. Wall 12b thus serves to protect the operator from injury due to hot water splash.

While the present invention has been shown and described with reference to the foregoing operational principals and preferred embodiment, it will be apparent to those skilled in the art that various changes in form and detail may be made without departing from the spirit and scope of the invention as defined by the claims.

We claim:

1. A system for use in frothing and heating milk received from a cold milk supply, said system comprising:

a hot water tank including a heating element which heats water contained within said hot water tank;

a milk conduit configured to draw milk from the cold milk supply along a milk flow path;

a milk frother configured to draw milk from the cold milk supply via a cold milk conduit and to froth such milk by controlled introduction of air;

a frothed milk conduit operatively connected to said milk frother, said frothed milk conduit being configured to pass frothed milk through said hot water tank, thereby heating the frothed milk.

2. The system of claim 1, wherein said hot water tank contains water at ambient pressure.

3. The system of claim 1, wherein said hot water tank includes a water level sensor, a water supply being configured to feed water to said hot water tank upon detecting a water level which has fallen below a predetermined level.

4. The system of claim 1, wherein at least a portion of said frothed milk conduit is coiled within said hot water tank.

5. The system of claim 1, wherein said hot water tank includes a temperature sensor, said heating element being configured to heat water within said hot water tank upon detecting that water temperature has fallen below a predetermined temperature.

6. The system of claim 1, wherein said milk frother includes an air inlet valve and one or more fluid pumps configured to mix milk from the cold milk supply with air introduced through said air inlet valve.

7. The system of claim 1 which further comprises an onboard refrigerator configured to house a replaceable cold milk supply, said milk conduit extending into said cold milk supply to draw milk therefrom.

8. The system of claim 1 which further comprises a sanitization subsystem which selectively substitutes a water supply for the cold milk supply.

9. The system of claim 1 which further comprises a sanitization subsystem having a milk selector valve positioned along the milk flow path and a sanitization conduit which connects said hot water tank to said milk selector valve, said milk selector valve being operable to selectively substitute passage of water for passage of milk along the milk flow path.

10. The system of claim 9, wherein said frothed milk conduit includes an milk discharge nozzle, said milk discharging nozzle being pivotal between a frothed milk discharge orientation wherein said milk discharge nozzle is configured to discharge into a beverage container and a rinse discharge orientation wherein said milk discharge nozzle is configured to discharge into a waste reservoir.

11. The system of claim 10, wherein said waste reservoir is isolated from the beverage container by a wall.

12. The system of claim 10, wherein said milk discharge nozzle is pivoted by a solenoid.

13. The system of claim 1 which further comprises an espresso water conduit connected to a water supply, said espresso water conduit being configured to pass water through said hot water tank, thereby heating the water.

14. The system of claim 13, wherein at least a portion of said espresso water conduit is coiled within said hot water tank.

15. The system of claim 14, wherein said espresso water conduit is coiled within an upper region of said hot water and said frothed milk conduit is coiled within a lower region of said hot water tank.

16. A method for frothing and heating :milk for use in coffee/espresso drinks, said method comprising the steps of:

providing a cold milk supply;

drawing cold milk from the cold milk supply via a milk conduit configured to pass the cold milk along a milk flow path;

frothing the cold milk by controlled introduction of air into the milk flow path;

passing frothed milk through an ambient pressure hot water tank via a coiled frothed milk conduit, thereby heating the frothed milk for discharge.

17. A coffee/espresso machine including a system for use in frothing and heating milk, said system comprising:

an ambient pressure hot water tank including a heating element which automatically heats water contained within said hot water tank to a predetermined temperature;

a replenishable cold milk supply;

a milk conduit configured to draw milk from said cold milk supply and pass such milk along a milk flow path;

a milk frother positioned along the milk flow path and including an air inlet valve and a pump which controllably mixes milk from said cold milk supply with air from said air inlet valve;

a frothed milk conduit fluidly connected to said milk frother, said frothed milk conduit being configured to pass cold frothed milk through said hot water tank, thereby heating the frothed milk for discharge.

18. The machine of claim 17 which further comprises an espresso water conduit connected to a water supply, said espresso water conduit being configured to pass water through said hot water tank, thereby heating the water for discharge.

19. The machine of claim 18, wherein said espresso water conduit is coiled within a first region of said hot water tank and said frothed milk conduit is coiled within a second region of said hot water tank.

20. The machine of claim 18, wherein said frothed milk conduit includes a milk discharge nozzle, said milk discharge nozzle being pivotal between a frothed milk discharge orientation wherein said milk discharge nozzle is configured to discharge into a beverage container and a sanitization orientation wherein said milk discharge nozzle is configured to discharge into a waste reservoir.

* * * * *